US012581410B2

(12) United States Patent   Shrestha

(10) Patent No.: US 12,581,410 B2
(45) Date of Patent: Mar. 17, 2026

(54) METHODS AND DEVICES OF SLEEP TIME MANAGEMENT FOR WIRELESS COMMUNICATION SYSTEMS

(71) Applicant: Morse Micro Pty. Ltd., Surry Hills (AU)

(72) Inventor: Aman Shrestha, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 291 days.

(21) Appl. No.: 18/581,990

(22) Filed: Feb. 20, 2024

(65) Prior Publication Data

US 2024/0298259 A1     Sep. 5, 2024

(30) Foreign Application Priority Data

Mar. 3, 2023   (AU) ................................. 2023900567

(51) Int. Cl.
*H04W 52/02*          (2009.01)

(52) U.S. Cl.
CPC ............................... *H04W 52/0216* (2013.01)

(58) Field of Classification Search
CPC ............. H04W 52/02; H04W 52/0258; H04W 74/0891; H04W 76/28; H04W 28/0865; H04W 68/005; H04W 40/005; H04M 1/002; H04M 3/32; H03J 2200/07; H03J 2200/09; H03J 2200/29
See application file for complete search history.

(56) References Cited

U.S. PATENT DOCUMENTS

| | | | | |
|---|---|---|---|---|
| 6,453,181 | B1 * | 9/2002 | Challa ................. | H04W 52/029 455/574 |
| 6,473,607 | B1 * | 10/2002 | Shohara ............ | H04W 52/0293 455/208 |
| 2009/0296531 | A1 * | 12/2009 | Haartsen ................... | H03L 1/00 368/46 |
| 2013/0329576 | A1 * | 12/2013 | Sinha ................ | H04W 52/0229 370/252 |
| 2015/0131543 | A1 * | 5/2015 | Huo ....................... | H04W 52/02 370/329 |
| 2016/0050624 | A1 * | 2/2016 | Tirronen ........... | H04W 52/0229 370/311 |

* cited by examiner

*Primary Examiner* — Un C Cho
*Assistant Examiner* — Alessandra Rose Glynn Williams
(74) *Attorney, Agent, or Firm* — Polsinelli PC

(57)          ABSTRACT

Methods and wireless communication devices for sleep time management comprise determining a current remaining time before performing a scheduled activity, comparing the current remaining time with a predetermined sleep duration, setting a current sleep time according to a predefined setting and the current remaining time and updating the current remaining time according to the current sleep time in response to the current remaining time being greater than the predetermined sleep duration, or setting the current sleep time to the current remaining time and updating the current remaining time to zero in response to the current remaining time being less than or equal to the predetermined sleep duration. The methods and wireless communication devices further comprise entering a power management mode for a period of time equal to the current sleep time and exiting from the power management mode to perform a calibration operation after the current sleep time.

20 Claims, 3 Drawing Sheets

METHODS AND DEVICES OF SLEEP TIME MANAGEMENT FOR WIRELESS COMMUNICATION SYSTEMS

The present application claims priority from Australian provisional patent application number 2023900567 filed on 3 Mar. 2023, the contents of which are incorporated herein by cross-reference.

FIELD OF THE INVENTION

The present disclosure generally relates to wireless communications. Specifically, aspects of the present disclosure are related to sleep time management for reducing power consumption in wireless communication devices.

BACKGROUND

A wireless communication system, for example, an IEEE 802.11 Wi-Fi communication system, typically includes multiple wireless communication devices including at least an Access Point (AP) communicating with one or more Stations (STAs). The AP of the wireless communication system may be coupled to another network, such as the Internet, and may enable STAs to communicate bi-directionally or enable a STA to communicate with other devices in the network through the AP. A wireless communication device sourcing a clock signal from a Resistor-Capacitor (RC) oscillator clock while entering a power management mode. The RC oscillator clock is an exemplary low power clock which consumes less power than other clock sources in the wireless device and is typically low cost and small. This RC oscillator clock however may suffer from clock drifting over time, especially when the wireless communication device is powered down for a long period of time. The power management mode may include a sleep mode where all processing cores and hardware circuitry, except hardware circuitry in an always-on block, will be turned off. The RC oscillator clock provides a timing reference for the always-on block. The RC oscillator clock is a low power clock which runs at the lowest power possible, and the timing may be inaccurate due to excessive changes in voltage and/or temperature. The always-on block contains hardware circuitry that needs to be active when everything else is halted or powered down. This RC oscillator clock provides a timing reference during the power management mode, and when the time is up, a timing circuit coupled to the RC oscillator block will wake up or power up corresponding processing core(s) and hardware circuitry. The low power RC oscillator block typically requires periodic calibration to prevent noticeable degrading due to voltage and temperature change. The conventional approach is to set a constant period and periodically calibrate the low power RC oscillator block by waking up the wireless communication device from the power management mode according to the constant period.

SUMMARY

The following summary presents technical features relating to one or more aspects disclosed herein and should not be considered as an extensive overview relating to all contemplated aspects, nor should the following summary be considered to identify key or critical elements relating to all contemplated aspects or to delineate the scope associated with any aspect. Accordingly, the following summary has the sole purpose to present certain concepts relating to one or more aspects relating to the algorithms disclosed herein in a simplified form to precede the detailed description presented below.

Disclosed are sleep time management methods and wireless communication devices thereof for reducing power consumption while maintaining device accuracy by performing one or more calibration operations in between a long sleep duration. According to at least one illustrative example, a sleep time management method for a wireless communication device wirelessly connecting to a wireless communication network comprises determining a current remaining time for the wireless communication device before performing a scheduled activity and comparing the current remaining time with a predetermined sleep duration. In response to the current remaining time being less than or equal to the predetermined sleep duration, a current sleep time is set according to the current remaining time. In response to the current remaining time being greater than the predetermined sleep duration, a current sleep time is set according to a predefined setting and the current remaining time. The sleep time management method further comprises entering a power management mode for a period of time equal to the current sleep time and exiting the power management mode to perform a calibration operation after the current sleep time. The wireless communication device consumes low power in the power management mode, for example, one or more processing cores in the wireless communication device are turned off in the power management mode. In some embodiments, the current remaining time is updated to zero when the current remaining time is less than or equal to the predetermined sleep duration, or the current remaining time is updated according to the current sleep time when the current remaining time is greater than the predetermined sleep duration. The sleep time management method further comprises comparing the updated current remaining time with the predetermined sleep duration to update the current sleep time when the updated current remaining time is not zero, and performing the scheduled activity when the updated current remaining time is zero. The updated sleep time is set to the current remaining time when the updated current remaining time is less than or equal to the predetermined sleep duration, or the updated sleep time is set according to the predefined setting and the updated current remaining time when the updated current remaining time is greater than the predetermined sleep duration. The sleep management method further comprises entering the power management mode for a period of time equal to the updated current sleep time.

In some embodiments, in response to the current remaining time being greater than the predetermined sleep duration, the sleep time management method comprises determining the current sleep time and one or more future sleep times for the wireless communication devices before performing the scheduled activity according to the predefined setting, where a duration of the current sleep time is different from at least one of the future sleep times.

In some embodiments, the scheduled activity includes receiving a beacon frame. For example, the beacon frame is a Delivery Traffic Indication Map (DTIM) beacon frame advertising a broadcast or multicast data traffic. The wireless communication device exits the power management mode to receive the beacon frame, synchronize with an Access Point (AP), and compute the current sleep time for a next sleep cycle from the updated current remaining time.

In some embodiments, the sleep time management method updates the current remaining time before entering the power management mode and checks the updated current remaining time after exiting the power management mode. The sleep time management method then compares the updated current remaining time with the predetermined sleep duration to set an updated current sleep time when the updated current remaining time is not zero or performs the scheduled activity when the updated current remaining time is zero. For example, the updated current sleep time is set according to the predefined setting and the current remaining time, and the current remaining time is updated again according to the updated current sleep time. The wireless communication device enters the power management mode according to the updated current sleep time.

The scheduled activity comprises serving a Target Wake Time (TWT) session in accordance with some embodiments. The power management mode may be a sleep mode, a power saving mode, a snooze mode, or any mode which reduces the power consumption of the wireless communication device. In some embodiments, the calibration operation includes calibrating a low power clock. The low power clock is a source clock for an always-on block in the wireless communication device, where the always-on block is active even in the power management mode. The low power clock is calibrated against a reference frequency generated by a high accuracy clock or a crystal oscillator. For example, the low power clock is a Resistor-Capacitor (RC) clock, and the high accuracy clock is a digital clock driven by an external high accuracy crystal oscillator. In some embodiments, the calibration operation includes changing one or more parameters to compensate for changes one or a combination of clock, voltage, and temperature. The calibration operation may include a short calibration operation or include a short calibration operation followed by a long calibration operation. For example, the long calibration operation is adaptively conducted when change or clock drift is detected from the short calibration operation, or when a difference between an updated frequency derived from the short calibration operation and an original frequency of the low power clock exceeds a threshold value.

In some embodiments, the current remaining time is updated by subtracting the current sleep time and a calibration time plus a core initialization time from the current remaining time. The predefined setting may be a predefined percentage, fraction, ratio, or value. In one embodiment, the predefined setting is determined based on an amount of a clock drift resulting from one or more previous sleep cycles, in another embodiment, the predefined setting is determined based on one or more compensation values used in one or more previous calibration operations. For example, the predefined setting can be set to a smaller percentage, fraction, ratio, or value to reduce the current sleep time when the clock drift or compensation value is relatively large.

In one embodiment, the predetermined sleep duration is determined based on an amount of clock drift resulting from one or more previous sleep cycles, and in another embodiment, the predetermined sleep duration is determined based on one or more compensation values used in one or more previous calibration operations. For example, the predetermined sleep duration can be set longer when the clock drift or the compensation value is relatively small.

An aspect of the present invention discloses a wireless communication device wirelessly connected in a wireless communication network, comprising a receiver, a transmitter, multiple processing cores, and one or more memory banks. The processing cores are communicatively coupled with the receiver and transmitter. Each processing core includes a processor and hardware circuitry. The memory banks communicatively coupled to the processing cores store processor readable codes and retain the processor readable codes during the power management mode. The processor readable codes executed by the processors in conjunction with the receiver configure the wireless communication device to determine a current remaining time for the wireless communication device before performing a scheduled activity. The wireless communication device if further configured to compare the current remaining time with a predetermined sleep duration; in response to the current remaining time being less than or equal to the predetermined sleep duration, a current sleep time is set to the current remaining time and the current remaining time is updated to zero. In response to the current remaining time being greater than the predetermined sleep duration, a current sleep time is set according to a predefined setting and the current remaining time, and the current remaining time is updated according to the current sleep time. The wireless communication device then enters a power management mode for a period of time equal to the current sleep time, where the wireless communication device consumes a low power in the power management mode. After the period of time equal to the current sleep time, the wireless communication device exits the power management mode to perform a calibration operation. The wireless communication device may enter the power management mode multiple times before performing the scheduled activity.

Some embodiments of the processing cores in the wireless communication device includes at least Physical (PHY), Media Access Control (MAC), and Applications (APPS) processing cores. In an embodiment, the PHY and MAC processing cores are turned off while the APPS processing core performs the calibration operation after the wireless communication device exits the power management mode.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Figure 1:
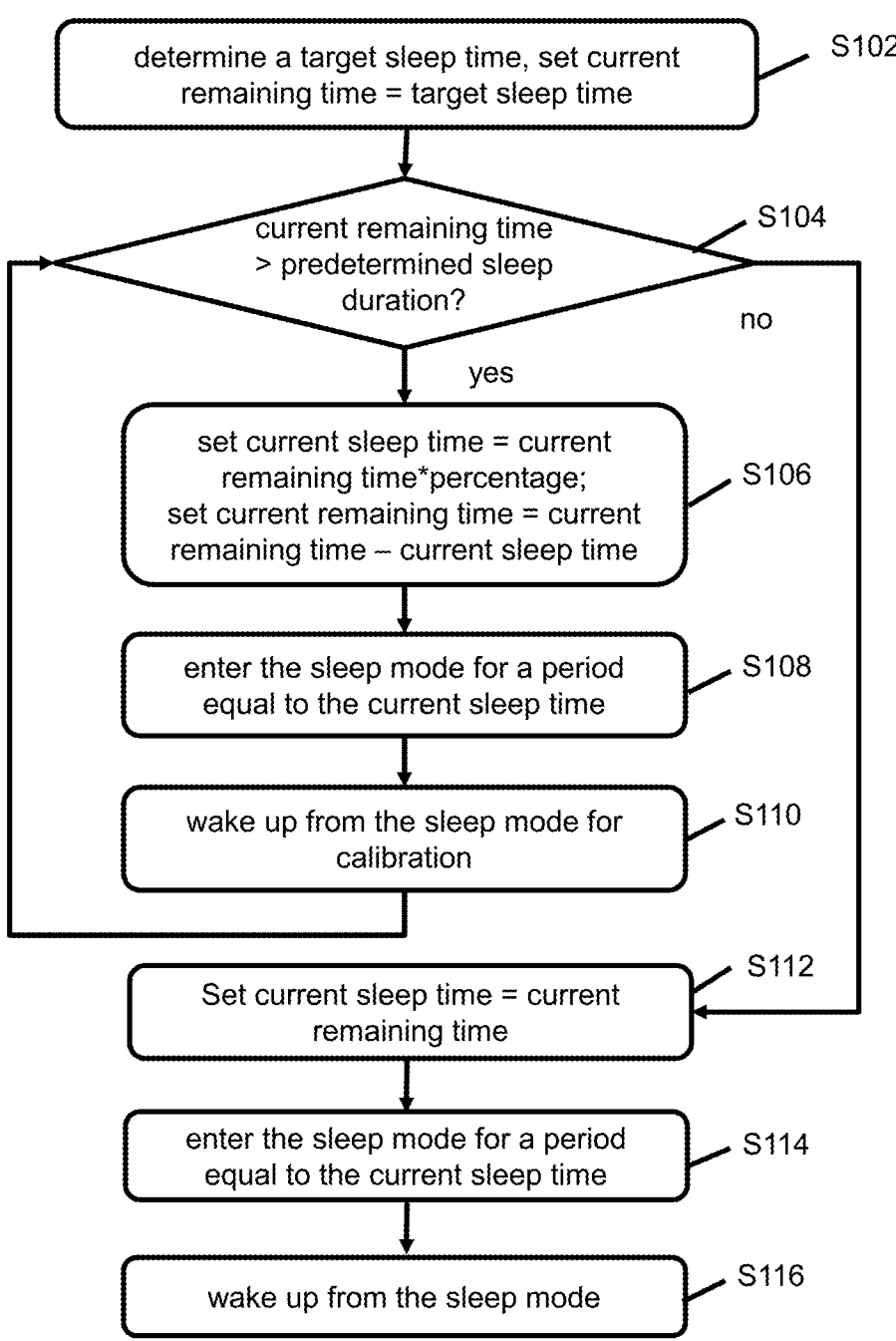
FIG. 1 is a flowchart illustrating an embodiment of a sleep time management algorithm for a wireless communication device.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive. The following description of the embodiments will provide those skilled in the art with an enabling description for implementing an example aspect. Changes may be made in the function and arrangement of elements without departing from the spirit and scope of the application as set forth in the claims.

Embodiments of the present invention offer some alternative approaches for managing the sleep time of wireless communication devices before waking up for a scheduled activity to prevent introducing any noticeable degradation due to insufficient calibration. Sleep time management is important for battery powered wireless communication devices especially for Internet of Things (IoT) applications as IoT devices are expected to operate for years without battery charging or replacement. A wireless communication device complying with a wireless communication standard, such as the IEEE 802.11ah standard, may reduce the overall dynamic and static power consumption using a collection of techniques and methodologies, for example, the wireless communication device frequently enters a power manage-ment mode in accordance with the Target Wake Time (TWT) and Delivery Traffic Indication Map (DTIM) power saving features for the purpose of optimizing battery lifetime.

TWT is designed for heavy deployment environment to reach consensus on non-overlapping schedules, which reserves battery power and reduces network congestion. TWTs permit an Access Point (AP) to define a specific time or set of times for individual Stations (STAs) to access the wireless medium by reaching a TWT agreement. STAs only require waking up from a power management mode at respective TWT sessions and may remain in the power management mode outside of the TWT sessions. The STA and the AP exchange information that includes an expected activity duration to allow the AP to control the amount of contention and overlap among competing STAs. Conse-quently, the required amount of awaken time can be reduced. The use of TWT is negotiated between a TWT requesting STA and a TWT responding STA, where the TWT respond-ing STA can be an AP. The AP may transmit TWT setup frames to more than one of its associated STAs. A TWT requesting STA is assigned specific times to wake up and exchange frames with a TWT responding STA. A TWT requesting STA wakes up and performs a frame exchange and receives information regarding to the next TWT in a response from the TWT responding STA when an explicit TWT methodology is employed; a TWT requesting STA calculates a next TWT by adding a fixed value to the current TWT value when an implicit TWT methodology is employed. TWT requesting STAs may wake up at times other than the respective TWT, for example it may wake up to receive beacons frames that are transmitted outside of the TWT sessions.

An AP broadcasts a beacon frame at regular intervals, and the beacon frame has a Traffic Indication Map (TIM) field. TIM and DTIM are mechanisms used by the AP to deliver queued up unicast and broadcast/multicast data traffic to associated STAs. DTIM allows power-conscious devices to save power by turning off the receivers until a DTIM beacon frame is broadcasted at a specific time known by the devices. The STA may notify the AP that it is enabling the power management mode by setting the power management bit of a frame to 1. The AP receives the frame from the STA and recognizes the STA is in the power management mode. The AP will store information in a buffer when it receives any data that is destined for the STA in the power management mode, then the AP will include an Association Identifier (AID) of the STA in the TIM Information Element (IE) field of a beacon frame and transmit the beacon frame to advertise there are buffered data for the STA. The STA does not have to wake for every beacon frame as it can sleep for a longer period of time to conserve more power, and how often the STA awakens may be determined based on a client variable such as a listen interval or a DTIM period which is config-ured by the user in the AP. For example, the STA wakes up to receive a beacon frame according to the listen interval, it first checks to see whether its AID is set in the TIM IE field of the beacon frame, and if its AID is set in the TIM IE field, the STA remains awake and sends a PS-Poll frame to the AP. The AP consequently sends the buffered unicast data frames to the STA upon receiving the PS-Poll frame. DTIM is a special type of TIM which is used to advertise broadcast or multicast data traffic. A configurable setting on the AP known as the DTIM period determines how often a DTIM beacon frame is transmitted. A DTIM period of 3 indicates that every third beacon frame is a DTIM beacon frame. A DTIM count of 0 indicates that the current received beacon frame is a DTIM beacon frame. The AP uses a DTIM beacon frame to indicate whether it has multicast or broadcast data traffic for the associated STAs and the AP sends the multicast or broadcast data immediately after the DTIM beacon frame when it has multicast or broadcast data traffic. The DTIM period is significant for applications that use multicasting. The wake-up interval for a STA to wake up and receive a DTIM beacon frame may be determined by the beacon interval and the DTIM period set at the AP. In cases when there is no traffic for the STA, the STA still wakes to receive the DTIM beacon frame according to the wake-up interval. The STA will go back to sleep until the next DTIM beacon frame if there is no traffic for the STA based on the TIM IE field.

In some embodiments of the present invention, an algo-rithm of sleep time management is employed in a wireless communication device operating in a Wi-Fi network to wake up the wireless communication device from a power man-agement mode. Waking up from a power management mode is also referred to as exiting the power management mode in the description. The wireless communication device is a STA or a module in the STA according to various embodi-ments. The power management mode includes but is not limited to a power saving mode, sleep mode, snooze mode, and any mode reducing the power consumption of the wireless communication device. The STA may suffer from clock drift over time or desynchronization with the AP after a long sleep period. Another concern of RC clock drift is the STA may sleep less or more than the expected period to receive a target DTIM beacon frame in the non-TWT case and to serve in a target Service Period (SP) in the TWT case. The STA will consume more battery power than it is supposed to be as it has to stay awake for a longer time to receive the DTIM beacon frame or to serve the service period if it sleeps less or more than the expected period. For example, the STA can only receive the next DTIM beacon frame if it missed the current DTIM beacon frame by sleeping longer than an expected duration due to the clock drift. Compared to periodically waking up the wireless communication device to calibrate the low power clock, embodiments of the sleep time management algorithm reduce the power consumption as the number of times for waking up the wireless communication device for calibra-tion may be reduced. Embodiments of the sleep time man-agement algorithm calculate one or more sleep times based on a predefined setting, which may be a predefined percent-age, ratio, fraction, or value, and wake the wireless com-munication device according to the calculated sleep times to calibrate one or a combination of clock, voltage, temperature, and RF related settings and parameters.

In some embodiments of the present invention, a target sleep time will be segmented into multiple sleep times for the purpose of calibration when the target sleep time is longer than a predetermined sleep duration. The target sleep time will be segmented according to a predefined percentage, fraction, ratio, or value and the wireless communication device will wake up in between two consecutive sleep times for calibration. In one embodiment, the predetermined sleep duration corresponds to a maximum sleep duration for a device where the time drift of the low power clock accumulated in the maximum sleep duration will never cause the device to miss the target wake time for receiving a DTIM beacon frame or to serve a service period. The wireless communication device may be configured to perform one or a combination of clock calibration, voltage setting calibration, temperature setting calibration, and Radio Frequency (RF) calibration when it is awake between two consecutive sleep times. Some embodiments of RF calibration involve tuning one or more RF parameters to compensate for the changes in voltage and temperature. The low power clock used for the always-on block typically runs at a much lower frequency than the main system clock, it thus consumes less power than the main system clock. The drawback of this low power clock is it has a low accuracy and may be sensitive to the operating temperature or environment. To correct this clock frequency fluctuation, the clock is calibrated against a reference frequency according to some embodiments of the present invention. The reference frequency may be generated by another oscillator or clock keeping a more accurate timing compared to the low power clock sourcing the always-on block. This clock calibration compensates for the drift of the clock induced by operating the wireless communication device in the power management mode over a retention period or sleep period, especially for a longer sleep period. For example, a number of clock cycles of the low power clock and a number of clock cycles of a high accuracy clock are counted over a predefined period of time. The predefined period may be set to equal to a predetermined number of clock cycles of the high accuracy clock, and the clock cycles of the low power clock are counted over the predetermined number of clock cycles of the high accuracy clock. The frequency of the low power clock may be estimated according to the frequency of the high accuracy clock and a ratio between the number of clock cycles of the low power clock and the predetermined number of clock cycles. The estimated frequency of the low power clock is then compared to an expected frequency of the low power clock to determine whether it is running too fast or too slow with respect to the expected frequency.

An embodiment of the always-on clock used to time the retention period or sleep period when the wireless communication device is operating in the power management mode is a 32 KHz RC clock. In this embodiment, the 32 KHz RC clock is calibrated against a 120 MHZ digital clock which is driven by a 32 MHz external high accuracy crystal oscillator. An embodiment of the wireless communication device has four processing cores, including upper Physical (PHY), lower PHY, Media Access Control (MAC), and Application (APPS) processing cores. Each of these four processing cores can selectively enter a Wait For Interrupt (WFI) state where the clock is gated and the processor halts or sleeps. The power consumption is thus reduced when any of the processing cores is in the WFI state as there is no clock going into the corresponding processor and eventually all hardware circuitry of the processor will be turned off. Each processing core can be woken up from the WFI state by a software or hardware interrupt instruction. The calibration algorithm for the 32 KHz RC clock includes a short calibration operation and a long calibration operation according to an embodiment. Both short and long calibration operations may be performed by only the APPS processing core in this embodiment. For example, when the MAC processing core decides to enter a power management mode, the three processing cores start shutting off one by one, from lower PHY, upper PHY, to MAC, leaving only the APPS processing core, the only operational processing core responsible for calibration. In an embodiment of the short calibration operation, the APPS processing core will only calibrate two clock cycles of the low power clock, which takes roughly 60 microseconds ($\mu$s). The maximum measured standard deviation of the low power RC clock frequency is 16 Hz across the temperature range of −10 degrees Celsius to 50 degrees Celsius after the short calibration operation. In some embodiments, the APPS processing core checks whether the calibration value varies by a user set threshold, for example, +/−50 Hz from the previous reading, that is the difference between the original frequency and the updated frequency of the low power clock is more than 50 Hz. The user set threshold is usually 3 times of the standard deviation value, which is determined after testing N number of parts across Process Voltage Temperature (PVT) condition to detect the clock has drifted from previous readings. The APPS processing core performs the long calibration operation when the difference is more than 50 Hz. The APPS processing core can calibrate 1024 clock cycles of the low power clock in the long calibration operation. The long calibration operation takes around 33 milliseconds (ms) which can achieve a maximum of 6 Hz of standard deviation across the temperature range of −10 degrees Celsius to 50 degrees Celsius.

In some embodiments of the sleep time management algorithm, the APPS processing core of the wireless communication device calibrates the low power clock and compares a target sleep time with a predetermined sleep duration to determine a first sleep time before the wireless communication device enters a power management mode. All other processing cores may be turned off to save power when the APPS processing core is performing calibration. In cases when the target sleep time exceeds the predetermined sleep duration, the APPS processing core computes the first sleep time according to a predefined setting and the target sleep time, for example, the first sleep time is calculated by multiplying the target sleep time with a predefined percentage. The first sleep time is set to equal to the target sleep time if the target sleep time is less than the predetermined sleep duration. The wireless communication device then enters the power management mode for a period equal to the first sleep time. After the first sleep time, the wireless communication device wakes up for calibration and it computes a second sleep time. For example, all processing cores wake up to receive a beacon frame and synchronize with the AP after the first sleep time. These processing cores except for the APPS processing core may be turned off or put in the WFI state after receiving the beacon frame according to an embodiment. In this embodiment, the APPS processing core performs calibration and computes the second sleep time while other processing cores are put in the WFI state. The APPS processing core derives a first remaining time based on the target sleep time and the first sleep time. In an embodiment, the time spent on calibration may be neglected as it is usually very short, or in another embodiment, the time spent on calibration is accounted in the next sleep cycle, so the first remaining time is derived by subtracting the first sleep time from the target sleep time. The calibration time may be significant in another embodiment, where the first remaining time is derived by subtracting the first sleep time and the calibration time from the target sleep time. If the first remaining time is greater than the predetermined sleep duration, a second sleep time is calculated according to the predefined setting and the first remaining time, for example, the first remaining time is multiplied by the predefined percentage to calculate the second sleep time, otherwise the second sleep time is equal to the first remaining time. The wireless communication device then enters the power management mode by shutting down all processing cores and hardware circuitry except for the always-on block after calibration. The always-on block wakes up the communication device after the second sleep time for calibration and evaluating a third sleep time. Similarly, a second remaining time is calculated based on the second sleep time and the first remaining time according to some embodiments, or based on the second sleep time, the first remaining time, and the calibration time according to some other embodiments. If the second remaining time is still greater than the predetermined sleep duration, a third sleep time is derived according to the second remaining time and the predefined setting, for example, the second remaining time is multiplied with the predefined percentage to calculate the third sleep time, otherwise the third sleep time is equal to the second remaining time. This process continues until the remaining time is less than the predetermined sleep duration. For example, the predefined percentage is set to 50%, so each of the subsequent sleep time is equal to half of the remaining time. The sleep time is derived from a predefined setting, where the predefined setting may be a predefined percentage, fraction, ratio or value, The predefined percentage, fraction, ratio, or value can be fixed, or it can be adaptively determined and configured. In one embodiment, the user can set the predefined setting according to the application or use cases. The predefined setting may be constrained within a predetermined range according to some embodiments. The predefined setting may be an application specific variable determined and configured depending on an application operated by the wireless communication device. In one embodiment, the predefined setting is set based on historical behavior of the clock drift or compensation value of the wireless communication device. The predefined setting may be updated at regular intervals based on a machine learning algorithm analyzing the historical behavior. For example, the predetermined range for the predefined setting is 25% to 95%, and the user can pre-select or adaptively select the predefined setting from a preset number of choices within the predetermined range.

The predetermined sleep duration is used to decide whether a next sleep cycle is needed, for example, the second remaining time is the third sleep time or the last sleep time in the last sleep cycle if the second remaining time is less than the predetermined sleep duration. In some embodiments, the predetermined sleep duration for a wireless communication device is configured according to a sleep duration resulting in the performance of the wireless communication device starting degrading due to clock drift over time. For example, a Packet Error Rate (PER) is measured across different sleep durations: 20, 60, 120, and 240 seconds (s), and the longest sleep duration among the sleep durations with a PER less than a maximum allowable PER is determined as the predetermined sleep duration. An example of the maximum allowable PER is 1%. The PER associated with the 240 s sleep duration is greater than 1% while the PERs associated with all other sleep durations are within 1%. In this example, the predetermined sleep duration is set to 120 s. In some embodiments, the predetermined sleep duration is determined depending on the clock accuracy and considering the changes in temperature and/or voltage as well as the clock drift.

In one specific embodiment of the sleep time management algorithm, the predefined percentage is set to 50% and the predetermined sleep duration is set to 120 s, which implies that the timing drift of the low power clock is in an acceptable range when the wireless communication device is in the power management mode for up to 120 seconds. In cases of a next DTIM beacon frame arriving in 500 s or a next TWT session scheduled in 500 s, the target sleep time is set to 500 seconds. A first sleep time for a first sleep cycle is equal to 250 s (which is 50% of 500 s) as the target sleep time of 500 s exceeds the predetermined sleep duration of 120 s. Assuming the calibration time is insignificant short in this example, a first remaining time is equal to 250 s (target sleep time 500 s minus the first sleep time 250 s), and a second sleep time for a second sleep cycle is equal to 125 s (which is 50% of 250 s) as the first remaining time 250 s is greater than the predetermined sleep duration of 120 s. In a third sleep cycle, a second remaining time 125 s is still greater than the predetermined sleep duration 120 s, so a third sleep time is calculated by multiplying 50% to the second remaining time 125 s, which is 62.5 s. The third remaining time 62.5 s is the fourth sleep time as it is less than the predetermined sleep duration 120 s. In this example, the 500 s target sleep time is segmented into four sleep times, 250 s, 125 s, 62.5 s, and 62.5 s to allow the wireless communication device to wake up in between consecutive sleep cycles for calibration.

In some embodiments of the present invention, the wireless communication device wakes up from a power management mode, receives a beacon frame in case of non-TWT, synchronizes with the AP, performs a calibration operation, compute a sleep time, and goes back to sleep. The calibration operation may include changing parameters to compensate for changes in one or a combination of the clock, voltage, and temperature. For example, the calibration operation can be a short calibration operation which only calibrates the low power clock by up to a predefined number of clock cycles, or the calibration operation changes a number of relevant parameters to adapt the change in environment. In cases of TWT, the wireless communication device wakes up, performs a calibration operation, and computes the sleep time or the time left for a next TWT session. Some examples of the relevant parameters are RF parameters and setting these parameters ensures the receiver hardware adapts the changes in environment from the long sleep period.

In comparison to the straightforward periodic wake-up algorithm for clock calibration, the sleep time management algorithm of the present invention consumes less power by waking up the wireless communication device fewer times for clock calibration, especially for long sleep periods. In one illustrative example, a TWT service period is 3600 s or a DTIM sleep time is 3600 s, the number of times waking up the wireless communication device implementing an embodiment of the sleep time management algorithm is only 5, while the number of times waking up the wireless communication device implementing a 60 s or 120 s periodic wake-up approach for calibration is 60 or 30 respectively. In this example of the sleep time management algorithm, the percentage is set to be 50% while the predetermined sleep duration is set to be 120 s, a 100 mAH battery will last at least 90 hours more compared to the 60 s periodic wake-up approach. The power consumption comparison between the periodic wakeup approach and the sleep for 50% of time approach according to an embodiment of the present invention is shown in Table 1.

TABLE 1

| TWT service period or DTIM sleep (s) | Approach | No. of time wakeup | Average power consumption (mA) | No. of hours 100 mAH battery will last |
|---|---|---|---|---|
| 3600 | Periodic wakeup of 60 s | 60 | 0.031 | 3225.80 |
| 3600 | Sleep for 50% of time | 5 | 0.0301510567 | 3316.63 |
| 86400 | Periodic wakeup of 60 s | 1440 | 0.031 | 3225.80 |
| 86400 | Sleep for 50% of time | 9 | 0.0300080923 | 3332.43 |

FIG. 1 is an exemplary flowchart showing a sleep time management algorithm for a wireless communication device according to an embodiment of the present invention. The wireless communication device determines a target sleep time in step S102. This target sleep time indicates when the wireless communication device needs to wake up for a scheduled activity. For example, the scheduled activity is the wireless communicate device needs to receive a DTIM beacon frame or serve a TWT session. The target sleep time of 3600 seconds means the wireless communication device is scheduled to perform the scheduled activity in 3600 seconds. In this embodiment, the wireless communication device cannot sleep over the entire target sleep time unless the target sleep time is less than a predetermined sleep duration. The sleep time management algorithm wakes up the wireless communication device to perform calibration to prevent system performance degradation. The current remaining time is first set to be equal to the target sleep time. In step S104, the current remaining time is compared to the predetermined sleep duration, and if the current remaining time is greater than the predetermined sleep duration, a current sleep time is set to be a percentage of the current remaining time, and the current remaining time is updated according to the current sleep time as shown in step S106. The wireless communication device enters the sleep mode for a period equal to the current sleep time in step S108 and wakes up from the sleep mode in step S110 for calibration. The wireless communication device then checks the current remaining time with the predetermined sleep duration again in step S104 and repeats the process until the current remaining time is less than or equal to the predetermined sleep duration, it then sets the current sleep time to be equal to the current remaining time in step S112. The wireless communication device consequently enters the sleep mode for a period equal to the current sleep time in step S114 and wakes up from the sleep mode in step S116 to perform the scheduled activity.

An alternative embodiment of the sleep time management algorithm determines a current remaining time for the wireless communication device before performing a scheduled activity and compares the current remaining time with a predetermined sleep duration. A current sleep time is equal to the current remaining time when the current remaining time is less than or equal to the predetermined sleep duration, or the current sleep time is computed based on a predefined setting and the current remaining time when the current remaining time is greater than the predetermined sleep duration. For example, the predefined setting is 0.75 or 75%, and the current sleep time is 75% of the current remaining time when the current remaining time is greater than the predetermined sleep duration. The wireless communication device enters a power management mode according to the current sleep time and then exits the power management mode to perform a calibration operation. One or more processing cores and hardware circuitry in the wireless communication device are shut down in the power management mode to conserve battery power of the wireless communication device. The current remaining time is updated to zero when the current remaining time is less than or equal to the predetermined sleep duration, or the current remaining time is updated according to the current sleep time when the current remaining time is greater than the predetermined sleep duration. For example, the updated current remaining time is equal to the current remaining time deducts the current sleep time. The updated current remaining time is then compared with the predetermined sleep duration to update the current sleep time when the updated current remaining time is not zero. The wireless communication device performs the scheduled activity when the updated current remaining time is zero. The updated sleep time is equal to the current remaining time when the updated current remaining time is less than or equal to the predetermined sleep duration, or the updated sleep time is computed based on the predefined setting and the updated current remaining time when the updated current remaining time is greater than the predetermined sleep duration.

In an alternative embodiment, the wireless communication device computes all sleep times based on a current remaining time and predefined setting before entering the power management mode. The current remaining time is determined to be a time difference between a current time and a target time for performing a scheduled activity. A current sleep time and one or more future sleep times are computed based on the current remaining time and predefined setting when the current remaining time is greater than the predetermined sleep duration. The current sleep time is set to equal to the current remaining time if the current remaining time is smaller than or equal to the predetermined sleep duration. A duration of the current sleep time is different from at least one or the future sleep times.

In some embodiments, the sleep time, the predefined setting, or the predetermined sleep duration is dynamically determined from an amount of the always-on (AON) clock drift resulting from one or more previous sleep cycles. For example, the wireless communication device extends or increase the current sleep time, predefined setting, or predetermined sleep duration when the amount of AON clock drift from the previous sleep cycle is relatively small, or it can reduce the current sleep time, predefined setting, or predetermined sleep duration when the amount of AON clock drift is relatively large. Typically, the clock drifts more when the sleep time is longer, so in some embodiments, the amount of clock drift or the corresponding calibration value is compared to one or more thresholds to determine whether the current sleep time, predefined setting, or predetermined sleep duration needs to be altered. The value of the threshold may be adaptively depends on the last sleep time according to an embodiment, for example, the threshold is higher when the last sleep time is longer, whereas the threshold is lower when the last sleep time is shorter. In cases when the clock drift or calibration value is compared to one threshold, the current sleep time, the predefined setting, or predetermined sleep duration is reduced when the clock drift or calibration value is higher than the threshold, otherwise the current sleep time is remained unchanged. In cases when there are upper threshold and lower threshold used to make the sleep time adjustment decision, the current sleep time, predefined setting, or predetermined sleep duration is adjusted to have less clock cycles or smaller percentage/fraction/ratio/value when the clock drift or calibration value exceeds the upper threshold, or the current sleep time, predefined setting, or predetermine sleep duration is adjusted to have more clock cycles or larger percentage/fraction/ratio/value when the clock drift or calibration value is below the lower threshold.

In one embodiment, when the wireless communication device wakes up in between two consecutive sleep cycles for AON clock calibration, a previous calibration value and a new calibration value are compared to estimate an AON clock drift resulting from the previous sleep cycle. Based on the estimated AON clock drift and the last sleep time, an estimation on how many additional or less clock cycles the system would have slept can be calculated, and this estimation can be used to derive a current sleep time for the upcoming sleep cycle. This estimation can be verified or adjusted after receiving a beacon frame which has an AP timestamp or a Time Synchronization Function (TSF).

Figure 2A:
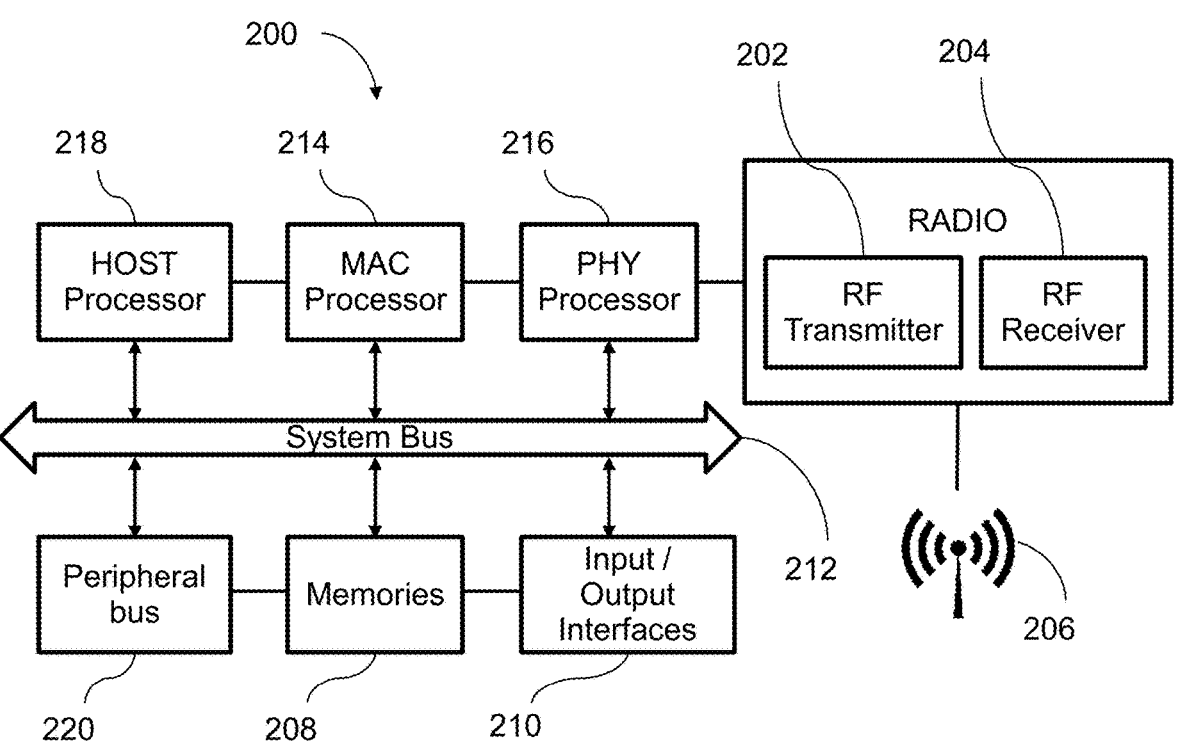
FIG. 2A illustrates a schematic block diagram of a wireless communication device according to some embodiments of the present invention.

FIG. 2A shows a high-level block diagram of a wireless communication device 200 implementing an embodiment of the present invention. Some embodiments of the wireless communication device 200 manage a Media Access Control (MAC) layer and a Physical (PHY) layer in accordance with an IEEE 802.11 standard. The wireless communication device 200 can be a Station (STA) or an Access Point (AP) of the wireless network. For example, the wireless communication device 200 can be implemented in a mobile device, a personal computer, a laptop computer, an Internet of Things (IoT) device, a wearable device, an extended reality device, a video server, a camera, or a communication device on a vehicle. The wireless communication device 200 includes a Radio Frequency (RF) transmitter module 202, an RF receiver module 204, an antenna unit 206, one or more memory banks 208, input and output interfaces 210 and communication bus 212. The RF transmitter module 202 and the RF receiver module 204 are also known as a modem (modulator-demodulator), which transmits data by modulating one or more carrier wave signals to encoded digital information, as well as receives data by demodulating the signal to recreate the original digital information. Furthermore, the wireless communication device 200 includes a MAC processor 214, a PHY processor 216, and a HOST processor 218. These processors can be any type of Integrated Circuit (IC) including a General Processing Unit (GPU), an Application Specific Integrated Circuit (ASIC) or Reduced Instruction Set Computer-Five (RISC-V) based ICs, amongst others. The memory 208 stores software including at least some functions of the MAC layer. Each processor executes software to implement the functions of the respective communication/application layer. The PHY processor 216, in particular, includes a transmitting signal processing unit and a receiving signal processing unit and manages the interface with the Wireless Medium (WM). The PHY processor 216 operates on Physical Protocol Data Units (PPDUs) by exchanging digital samples with the radio module which comprises the RF transmitter 202, Digital-to-Analog Converters (DACs), the RF receiver 204, Analog-to-Digital Converters (ADCs) and digital filters. The MAC processor 214 executes MAC level instructions and manages the interface between the application software and the WM, through the PHY processor 216. The MAC processor 214 is responsible for coordinating access to the WM so that the AP and STAs in range can communicate effectively. The MAC processor 214 adds header and tail bytes to units of data provided by the higher levels and sends them to the PHY layer for transmission. The reverse happens when receiving data from the PHY layer. If a wireless frame is received in error, the MAC processor 214 manages the retransmission of the wireless frame. The HOST processor 218 interfaces with the MAC layer and is responsible for running high level functionalities of the wireless communication device 200.

The peripheral bus 220 connects to a number of peripherals that support core functions of the wireless communication device 200, including timers, interrupts, radio/filters/system registers, counters, Universal Asynchronous Receiver-Transmitter (UART) and General Purpose Input Output (GPIO) interfaces and others. The PHY processor 216, the MAC processor 214, the HOST processor 218, the peripheral bus 220, memory 208 and input/output interfaces 210, communicate with each other via the system bus 212. The memory 208 may further store an operating system and applications. In some embodiments, the memory 208 may store recorded information about captured frames and packets. The input/output interface unit 210 allows for exchange of information with a user. The antenna unit 206 may include a single antenna or multiple antennas.

Figure 2B:
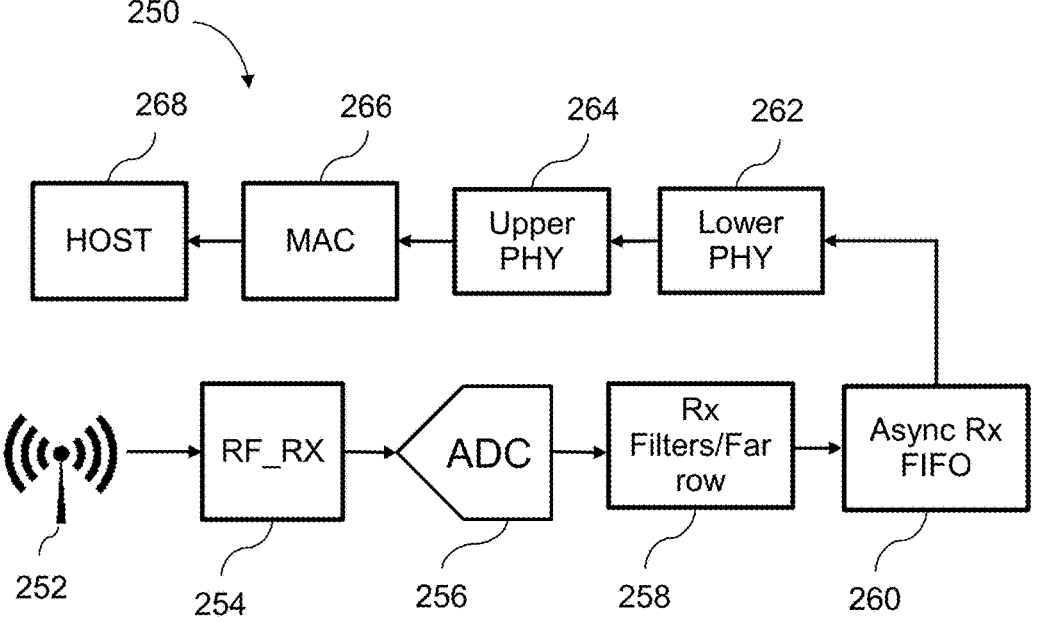
FIG. 2B illustrates a schematic block diagram of a receiver data flow architecture in a wireless communication device used for receiving radio signals.

FIG. 2B illustrates a simplified schematic block diagram of a receiver data flow architecture 250 used for receiving radio signals transmitted to a wireless communication device. Radio signals are received over the WM and transformed into electrical signals by a receiving antenna 252. The received signal is conditioned using a series of analog RF receiving (Rx) filters 254 before being converted into a digital signal using an ADC 256. The digital signal output from the ADC 256 is conditioned again using a digital filter bank 258, which can include one or more digital RF filters and/or a farrow filter, before samples in the digital signal are collected in an asynchronous receiving First-In-First-Out (FIFO) data structure 260. Samples in the asynchronous receiving FIFO data structure 260 can be accessed by a packet detect module and a sub-band module, both modules may be included in a lower-level PHY portion 262. In some embodiments, the lower-level PHY portion 262 together with an upper-level PHY portion 264 are included in the PHY processor 216 illustrated in FIG. 2A. The packet detect module included in the lower-level PHY portion 262 has hardware and/or implement algorithms that can be used to analyze the initial sections of a PHY Protocol Data Unit (PPDU) in the time domain. Based on the analysis, the packet detect module recognizes a received 802.11 frame and synchronizes frequency and timing of the wireless communication device with the packet being received. The sub-band module has hardware and/or implement algorithms that can be used to detect which subchannel in the allocated frequency band is being used for transmitting the packet being received.

Once a packet is detected and a relevant subchannel is established, samples are forwarded to an upper-level PHY portion 264. Some embodiments of the upper-level PHY portion 264 process and decode Orthogonal Frequency Division Multiplexing (OFDM) symbols to reconstruct the full PPDU. The reconstructed PPDU is subsequently processed by the MAC layer processor 266 for extracting the data payload and providing relevant information to the HOST layer processor 268 for consumption.

Figure 2C:
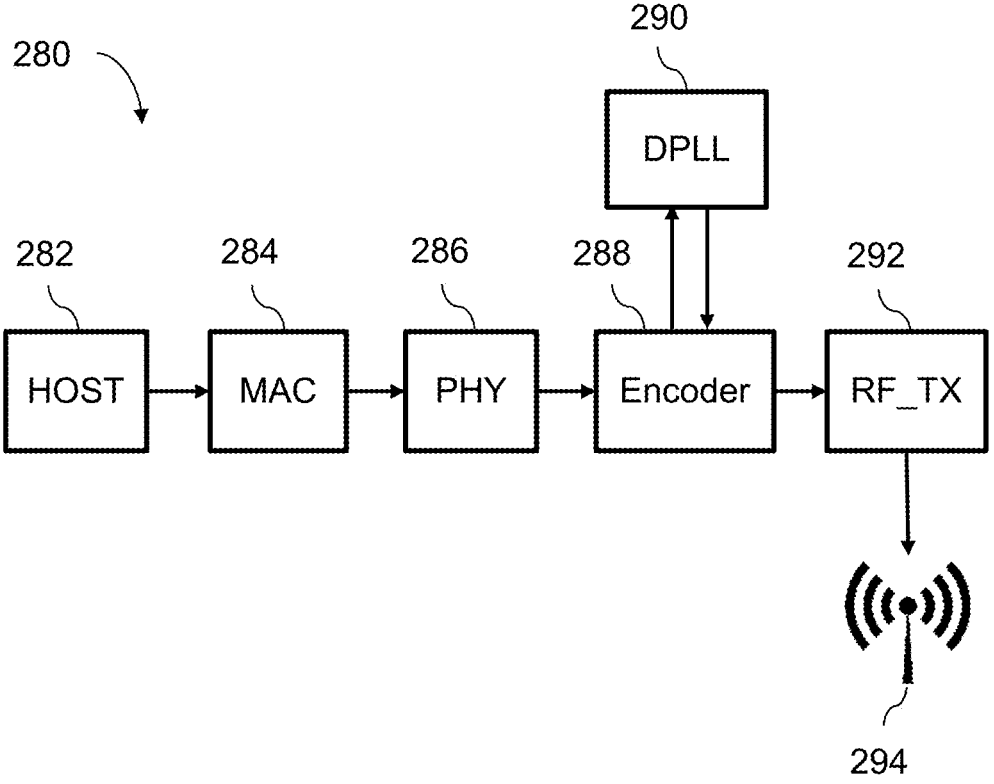
FIG. 2C illustrates a schematic block diagram of a transmitter data flow architecture used for transmitting radio signals over the wireless medium.

FIG. 2C illustrates a simplified schematic block diagram of a transmitter data flow architecture 280 used for transmitting radio signals over the WM. Data is generated from the HOST or APPS module 282 and packaged in a MAC level Protocol Data Unit (MPDU) to be routed over the wireless network by the MAC management module 284. The PHY module 286 interfaces with the WM and compiles a PHY level Protocol Data Unit (PPDU) by adding a PHY preamble and the tail to the MPDU. Usually a Modulation Coding Scheme (MCS) for transmission of the packet over the medium is established using a rate control algorithm by the MAC module 284 or the PHY module 286. The modulation scheme selected defines the modulation technique to be used to transmit the data on the WM and the coding rate. Based on the modulation scheme selected, for example Quadrature Amplitude Modulation (QAM) 64, the PPDU is modulated to be transmitted on the WM. The encoder module 288 generates signals corresponding to points of a QAM constellation symbols (groups of bits of the PPDU) which can be encoded using polar (r-θ) or cartesian (Q-I) coordinates. The modulation is done by linking the encoder module 288 to a Digital Phase Lock Loop (DPLL) 290. The modulated signals are filtered by analog filters 292 and transmitted using a transmitting antenna 294.

The predefined setting, for example, the percentage for calculating the current sleep time from a current remaining time, can be adaptively determined for various use cases. The predefined setting can depend on how accurately in terms of time the transceiver needs to receive or transmit data according to some embodiments. The amount of RC clock drift with respect to the change in temperature across different Battery Voltage (VBAT) values is measured. The measured RC clock drift variation is within 1000 Hz even in the worst case.

In an embodiment of implementing the sleep time management algorithm in STAs such as a weather station, a less sensitive approach is used. Weather stations typically only transmit data once every half an hour or every hour, thus these weather stations do not need to be very sensitive about the internal 32 KHz RC clock drift to meet the wake time. A timing error of up to +/−1 to 2 minutes will be tolerable for the weather stations, and it is unlikely for the weather station to accumulate an error greater than 1 minute in its target wake time. In such an application, a relatively high percentage of sleep time such as 75% to 90%, or more than 90% of sleep time will be sufficient to meet the target wake time. Upon each wake up, the STA can either wait and receive a short beacon frame from the AP and synchronize its time with the AP or the STA can estimate the time and calculate a next wake up time according to the clock drift from the last sleep.

For some other use cases such as smart humidity and temperature sensors, the sampling rate of these sensors is typically chosen somewhere around 5 minutes to 10 minutes. A default 50% sleep cycle will give an adequate performance in terms of target wake-time reliability.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims. Well-known circuits, processes, algorithms, structures, and techniques may be shown without unnecessary detail to avoid obscuring the aspects.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks may be stored in a computer-readable or machine-readable medium. The computer-readable medium may comprise memory or data storage media, such as Random-Access Memory (RAM) such as Synchronous Dynamic Random-Access Memory (SDRAM), Read-Only Memory (ROM), Non-Volatile Random-Access Memory (NVRAM), Electrically Erasable Programmable Read-Only Memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves. The program code may be executed by a processor, which may include one or more processors, such as one or more Digital Signal Processors (DSPs), general purpose microprocessors, an Application Specific Integrated Circuits (ASICs), Field Programmable Logic Arrays (FPGAs), or other equivalent integrated or discrete logic circuitry. Such a processor may be configured to perform any of the steps described in this disclosure. A general-purpose processor may be a microprocessor; alternatively, the processor may be any conventional processor, controller, microcontroller, or state machine. A processor may also be implemented as a combination of computing devices.

To clearly illustrate the interchangeability of hardware and software, various illustrative components, blocks, modules, engines, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present application.

What is claimed is:

1. A sleep time management method for a wireless communication device wirelessly connecting to a wireless communication network, the method comprising the steps of:

determining a current remaining time for the wireless communication device before performing a scheduled activity;

comparing the current remaining time with a predetermined sleep duration;

in response to the current remaining time being less than or equal to the predetermined sleep duration, setting a current sleep time to the current remaining time;

in response to the current remaining time being greater than the predetermined sleep duration, setting a current sleep time according to a predefined setting and the current remaining time;

entering a power management mode for a period of time equal to the current sleep time, wherein the wireless communication device consumes low power in the power management mode; and exiting the power management mode and performing a calibration operation by the wireless communication device after the period of time equal to the current sleep time.

2. The method of claim 1, further comprising:

updating the current remaining time to zero in response to the current remaining time being less than or equal to the predetermined sleep duration, or updating the current remaining time according to the current sleep time in response to the current remaining time being greater than the predetermined sleep duration;

comparing the updated current remaining time with the predetermined sleep duration to update the current sleep time when the updated current remaining time is not zero, wherein the updated sleep time is set to the updated current remaining time in response to the updated current remaining time is being less than or equal to the predetermined sleep duration, and the updated sleep time is set according to the predefined setting and the updated current remaining time in response to the updated current remaining time is being greater than the predetermined sleep duration;

entering the power management mode for a period of time equal to the updated current sleep time; and performing the scheduled activity after exiting the power management mode when the updated current remaining time is zero.

3. The method of claim 1, further comprises in response to the current remaining time being greater than the predetermined sleep duration, determining the current sleep time and one or more future sleep times for the wireless communication devices before performing the scheduled activity according to the predefined setting, wherein a duration of the current sleep time is different from at least one of the future sleep times.

4. The method of claim 1, wherein the scheduled activity comprises receiving a beacon frame, and the beacon frame is a Delivery Traffic Indication Map (DTIM) beacon frame advertising a broadcast or multicast data traffic.

5. The method of claim 4, wherein exiting the power management mode further comprises receiving the beacon frame, synchronizing with an Access Point (AP), and computing the current sleep time from the updated current remaining time.

6. The method of claim 1, wherein the scheduled activity comprises serving a Target Wake Time (TWT) session.

7. The method of claim 1, wherein the power management mode comprises one or a combination of a sleep mode, a power saving mode, a snooze mode, and a mode which reduces the power consumption of the wireless communication device.

8. The method of claim 1, wherein performing the calibration operation comprises calibrating a low power clock, wherein the low power clock is a source clock for an always-on block in the wireless communication device, and the always-on block is activated in the power management mode.

9. The method of claim 8, wherein the low power clock is calibrated against a reference frequency generated by a high accuracy clock or an oscillator.

10. The method of claim 9, wherein the low power clock is a Resistor-Capacitor (RC) clock, and the high accuracy clock is a digital clock driven by an external high accuracy crystal oscillator.

11. The method of claim 1, wherein performing the calibration operation comprises changing one or more parameters to compensate for changes in one or a combination of clock, voltage, temperature, and Radio Frequency (RF).

12. The method of claim 1, wherein performing the calibration operation comprises conducting a short calibration operation or both the short calibration operation followed by a long calibration operation.

13. The method of claim 12, wherein the long calibration operation is conducted when a difference between an updated frequency derived from the short calibration operation and an original frequency of the low power clock exceeds a threshold value.

14. The method of claim 1, wherein the current remaining time is updated by subtracting the current sleep time and a calibration time from the current remaining time.

15. The method of claim 1, wherein the predefined setting is a predefined percentage, fraction, ratio, or value.

16. The method of claim 15, wherein the predefined setting is determined based on an amount of a clock drift resulting from one or more previous sleep cycles or the predefined setting is determined based on one or more compensation values used in one or more previous calibration operations.

17. The method of claim 1, wherein the predetermined sleep duration is determined based on an amount of clock drift resulting from one or more previous sleep cycles or the predetermined sleep duration is determined based on one or more compensation values used in one or more previous calibration operations.

18. A wireless communication device wirelessly connected in a wireless communication network, comprising:

a receiver and a transmitter;

a plurality of processing cores, each comprising a processor and hardware circuitry, communicatively coupled with the receiver and transmitter; and one or more memory banks, communicatively coupled to the processing cores and storing processor readable codes that, when executed by the processors in conjunction with the receiver, is configured for:

determining a current remaining time for the wireless communication device before performing a scheduled activity;

comparing the current remaining time with a predetermined sleep duration;

in response to the current remaining time being less than or equal to the predetermined sleep duration, setting a current sleep time to the current remaining time and updating the current remaining time to zero;

in response to the current remaining time being greater than the predetermined sleep duration, setting a current sleep time according to a predefined setting and the current remaining time, and updating the current remaining time according to the current sleep time;

entering a power management mode for a period of time equal to the current sleep time, wherein the wireless communication device consumes a low power in the power management mode; and exiting the power management mode and performing a calibration operation by the wireless communication device after the period of time equal to the current sleep time.

19. The wireless communication device of claim 18, wherein the processing cores comprise at least Physical (PHY), Media Access Control (MAC), and Applications (APPS) processing cores.

20. The wireless communication device of claim 19, wherein the PHY and MAC processing cores are turned off while the APPS processing core performs the calibration operation after exiting the power management mode.

\* \* \* \* \*